United States Patent [19]
Gamel et al.

[11] Patent Number: 5,953,906
[45] Date of Patent: Sep. 21, 1999

[54] EXHAUST GAS PURIFICATION DEVICE FOR INTERNAL COMBUSTION ENGINES

[76] Inventors: Florian Gamel, Jacob-Klar-Strasse 11, Munich, Germany, D80796; Siegfried Kany, Hansengel 4, Hohentengen, Germany, D-78901

[21] Appl. No.: 08/875,930
[22] PCT Filed: Feb. 10, 1996
[86] PCT No.: PCT/DE96/00218
  § 371 Date: Aug. 8, 1997
  § 102(e) Date: Aug. 8, 1997
[87] PCT Pub. No.: WO96/24755
  PCT Pub. Date: Aug. 15, 1996

[30] Foreign Application Priority Data

Feb. 10, 1995 [DE] Germany .......................... 195 04 450

[51] Int. Cl.⁶ .................................................. F01N 3/00
[52] U.S. Cl. .............................. 60/274; 60/285; 422/174; 422/177; 29/890
[58] Field of Search .................... 422/174, 177; 29/890; 60/274, 285

[56] References Cited

U.S. PATENT DOCUMENTS

| | | | |
|---|---|---|---|
| 3,884,037 | 5/1975 | Barber et al. ............................. | 60/292 |
| 4,443,559 | 4/1984 | Smith, Jr. ................................. | 502/527 |
| 4,774,217 | 9/1988 | Takeuchi et al. ....................... | 502/178 |
| 5,179,061 | 1/1993 | Haerle ..................................... | 502/339 |

FOREIGN PATENT DOCUMENTS

| | | |
|---|---|---|
| 3731766 | 3/1989 | Germany . |
| 9313112 | 2/1994 | Germany . |
| 4305915 | 11/1994 | Germany . |

*Primary Examiner*—Thomas E. Denion
*Attorney, Agent, or Firm*—Collard & Roe, PC

[57] ABSTRACT

The invention concerns a device for reducing the amount of soot particles discharged from the exhaust gas system of an internal combustion engine. Owing to the addition of an additive to the fuel, the ignition temperature of the soot particles during afterburning is reduced to between approximately 300 and 350° C., so dropping far below the normal operating temperature of the unit. Consequently the regeneration process of the filter in the unit starts comparatively early. An essential component of the present invention is the so-called deep-bed filter which is composted of a plurality of rolled-up tubes of special ceramic thread and a heat-resistant resilient steel wire. The special production method and special construction of the ceramic stack according to the invention guarantee a satisfactory useful life of the soot filter which withstands vibrations and mechanical stresses.

19 Claims, 5 Drawing Sheets

EXHAUST GAS PURIFICATION DEVICE FOR INTERNAL COMBUSTION ENGINES

BACKGROUND OF THE INVENTION

1. Field of the Invention

The invention relates to an exhaust gas purification device for internal combustion engines. Such devices are used especially with Diesel engines, emergency power generator installations, construction machinery and Diesel locomotives, where the emission of soot particles is subjected to after-burning, so that the quantity of emitted soot particles is drastically reduced.

2. The Prior Art

Such devices are methods for reducing the amount of soot particles with the help of exhaust gas after-treatment with ceramic filters are well-known in the state of the art. It is known, furthermore, to regenerate the filter material with the help of after-burning of the soot particles, whereby certain small amounts of a catalyzing additive are added to the fuel used. Such an additive produces an exothermic chemical reaction with the soot particles, so that the ignition temperature of the soot particles is practically lowered.

In the past, monolithic ceramic filters were found to have only little advantageous effect on the operating life of the filter, because the filters broke after a short time due to sudden overheating caused by thermal stresses.

So-called fabric filters, which basically consist of a great number of assembled ceramic filaments, appear to be far more favorable. Such type of filter is more elastic in its overall behavior and consequently capable of withstanding the possible occurrence of thermal stress in a superior way. The soot particles exiting from the engine are collected by a ceramic matting and, due to the reduction in the combustion temperature effected by the added additive, the regeneration process of the filter starts early at about 320° C., a temperature practically reached on the filter shortly after the engine has been started. For regenerating the filter, thus no further measure or device is required for putting the ignition temperature into action. Additional filter regeneration devices are relatively expensive and, furthermore, require considerable expenditure with respect to energy to be supplied, which makes the overall installation uneconomical.

The ceramic filters known heretofore, which are woven or knittted using ceramic yarn, all have the decisive drawback that they are not capable of maintaining their initially adjusted material density in the hollow body of the filter while operating over longer periods of time, for the reason that they "collapse" within themselves. Attempts to provide the filter fabric with a certain amount of stability by inserting steel nettings in the fabric were only moderately successful because the useful life of the filters does not suffice for continuous operation.

SUMMARY OF THE INVENTION

Therefore, based on the above state of the art the invention is based on the problem of making available a soot filter for internal combustion engines which is capable of assuring inner mechanical stability under high mechanical stress.

This object is achieved by the unique device of the invention.

The device of the invention for reducing the amount of soot particles exiting from internal combustion engines, particularly Diesel internal combustion engines, such device consisting of a container with a short gas inlet pipe and a short gas outlet pipe, and a hollow body which is partially filled with a knitting of filter material, whereby a catalytic additive is added to the fuel upstream of the internal combustion engine, is characterized by a filter material having a plurality of knitted ceramic packets, whereby the ceramic packets are knitted hoses or tubes made of highly fine ceramic threads, such hoses being rolled up from one end, and such ceramic threads being interwoven with a heat-resistant wire, whereby the rough mesh of the knitted hose has a defined measure, and the heat-resistant wire passes through each individual mesh of the knitting parallel with the ceramic yarn.

In an advantageous embodiment, a hollow body is present in the container with a short gas inlet and gas outlet pipe, said hollow body receiving the knitted ceramic packets. The hollow body is a cylinder with walls having a great number of break-throughs for the passage of gas. In this connection, it is not important to the invention whether the gas passes through the filter from the outside to the inside, or from the inside to the outside. The ceramic packets according to the invention are advantageously manufactured from knitted hoses, which are rolled up from one end to form a bead-like ring.

According to the invention, the ceramic yarns used for knitting consist of very fine ceramic filaments with a diameter of about 6 $\mu$m, whereby the finished yarn has a diameter of about 1 mm and is textured and twisted.

Of decisive importance to the present invention is that a heat-resistant wire is extended parallel with the yarn, which wire advantageously should be made of a VA-steel. The diameter of such steel wire amounts to approximately 0.2 mm. It is very important to the present invention that the VA-grade steel wire passes through each individual mesh of the knitting, i.e., of the knitted hose. This provides the entire ceramic packet with inner elasticity, preventing later compression of the knitted structure or ceramic packets.

Furthermore, it is advantageous for the filter according to the invention if a mesh width of about 4.5 mm is selected if the knitted structure is divided by about 5 mm with a right-left knitting pattern.

The extremely advantageous chemical composition of the ceramic yarn is specified as follows:

93.5% $\leq$ SiO$_2$ 4.0% $\approx$ Al$_2$O$_3$ and 0.8% $\geq$ Na$_2$O.

This product, which is known as Hakotherm-1200, was recently successfully tested in a practical test in a Diesel-engine equipped passenger car driven over approximately 100,000 km. The ceramic material used has a thermal resistance of up to approximately 1,200° C.

Advantageously, the iron-containing additive is supplied to the fuel upstream of the internal combustion engine with the help of an electronically controlled metering system. Of course, other types of additives not containing iron may be advantageous for the present invention as well without being specified here explicitly.

The advantageous process of the invention for producing the ceramic packets is characterized in that a wire of a thickness of about 4 mm with a great number of barbs is pulled through the circumference of the one end of the knitted hose, which barbs get hooked in the knitting when the wire is turned around its longitudinal axis, and in this way completely roll up the prefabricated knitting up to its other end.

BRIEF DESCRIPTION OF THE DRAWINGS

The present invention is explained in greater detail in the following by reference to the drawings, in which.

DETAILED DESCRIPTION OF PREFERRED EMBODIMENTS

Figure 1:
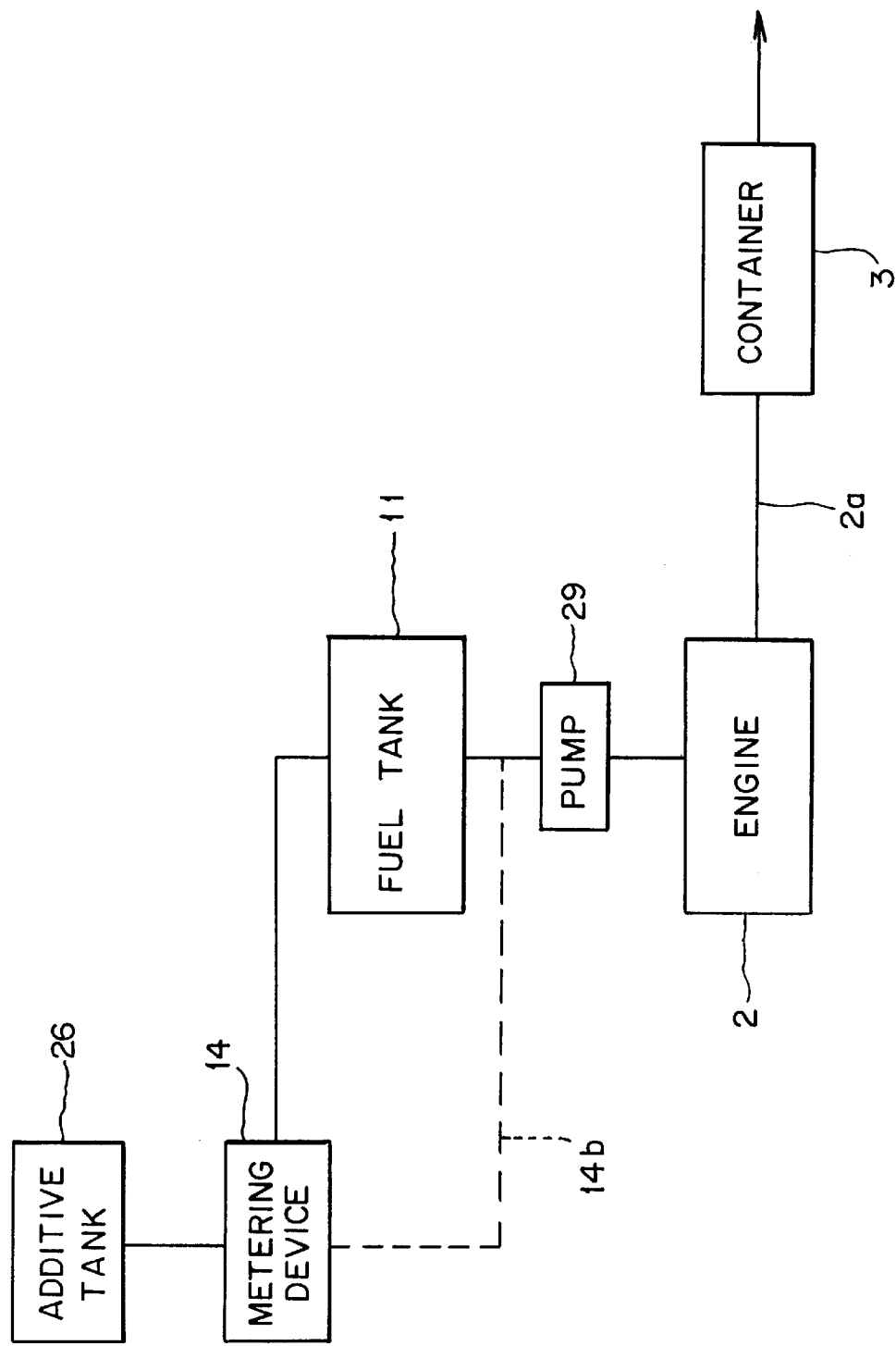
FIG. 1 shows a block diagram of the entire device for reducing the emission of soot from the exhaust gas line of an internal combustion engine (2)

FIG. 1 shows a block diagram of the entire device for reducing the emission of soot from an internal combustion engine 2. The device is particularly effective and efficient with Diesel internal combustion engines because emission of soot particles is relatively high with such engines. The soot particles produced in internal combustion engine 2 are received via a line 2b in container 3 of the invention, the latter being arranged in the exhaust gas system instead of the muffler normally installed. In container 3, the exiting soot particles are intermediately stored until they have reached their combustion temperature.

In the simplest case, the catalytic additive for lowering the ignition temperature is already contained in the fuel, which is stored in fuel tank 11. Heavy metals such as copper, nickel and cobalt could be considered as additives producing the highest reduction in the ignition temperature. However, said metals have to be excluded, to begin with, on grounds of environmental protection. Furthermore, rare earths are known as catalytically acting metals; however, their environmental impact has not yet been researched to the fullest extent. On the other hand, iron, which lowers the ignition temperature of the soot particles significantly to about 320° to 350° C. as well, and which, furthermore, is viewed as harmless to the environment, appears to be suitable as active substance for the additive. In order to Comply with the special Diesel fuel specifications for internal combustion engines, an organic iron compound was developed in a Diesel-like solvent and successfully tested as an additive. The additive concentrations can be viewed as very low and, with a medium-sized passenger car, amount to about 3 to 4 liters per 100,000 km. This shows that the amounts of additive required for regenerating the particle filter are extremely low.

The additive is withdrawn from additive tank 26 with the help of a metering device 14 and admitted into fuel tank 11 via the injection pump 29, which is required with Diesel internal combustion engines, the fuel mixture consisting of Diesel fuel and additive is then supplied to the combustion chambers of engine 2.

Basically, the additive, too, can be directly admitted into the fuel feed line upstream of injection pump 29 via a bypass 14b. Metering device 14 is equipped with a special—not shown here—metering valve, which is controlled electronically.

During combustion of the fuel in internal combustion engine 2, relatively large amounts of soot particles are produced, which have to be reduced under any circumstances because they are assumed to have a highly carcinogenic effect on living organisms.

As stated above, the soot particles pass from internal combustion engine 2 via exhaust gas line 2a into container 3, where the soot particle filter according to the invention is located.

Figure 2:
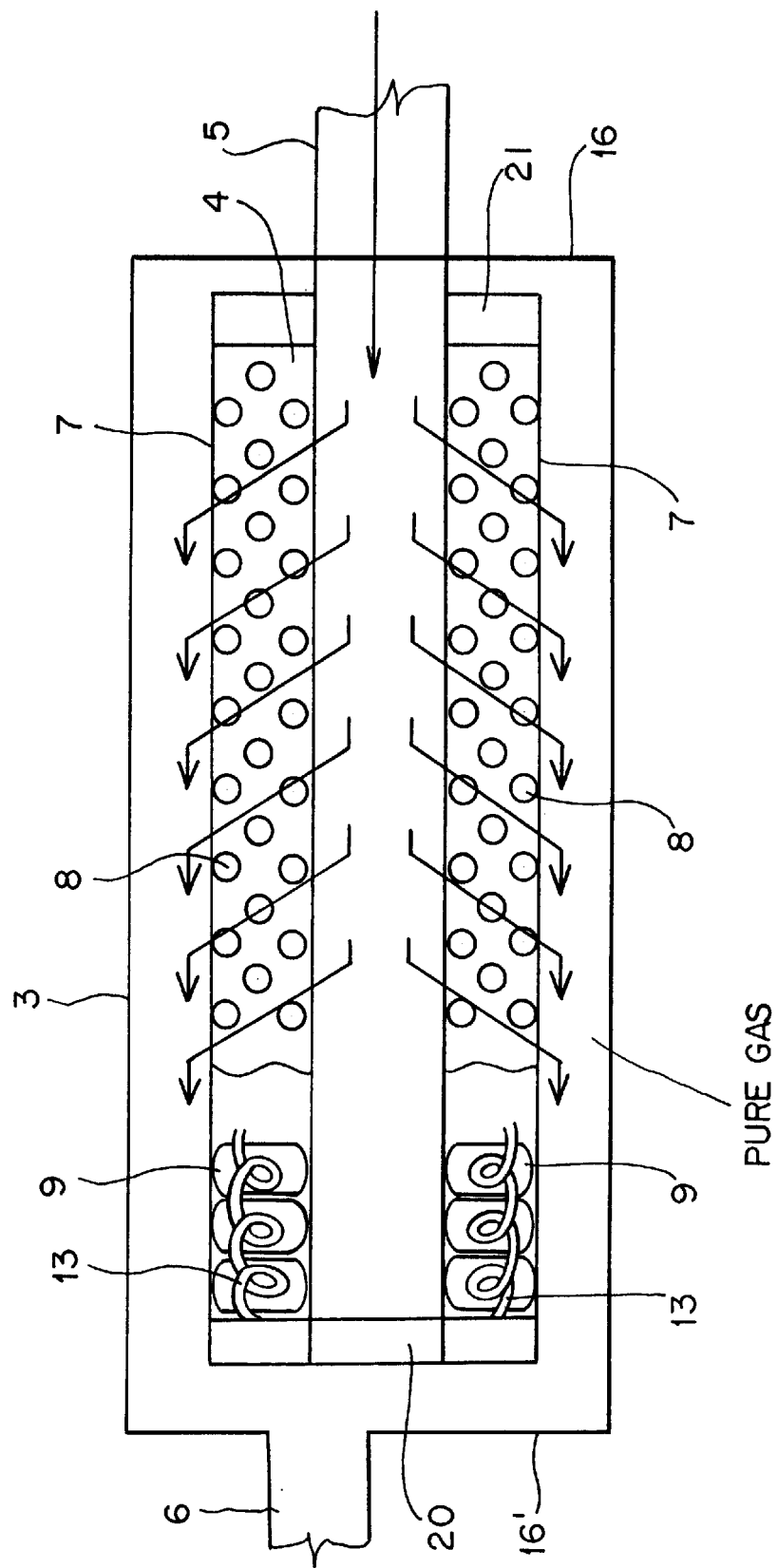
FIG. 2 shows the basic structure of a container (3) with the hollow body (4) of the invention contained therein, and with the ceramic packets (9) according to the invention.

FIG. 2 shows the basic structure of container 3 with hollow body 4 of the invention contained therein. The soot particles coming from internal combustion engine 2 enter into container 3 together with the gas in short gas inlet pipe 5. Short gas inlet pipe 5 is advantageously arranged concentrically relative to container 3 if the latter has the shape of a cylinder. The faces 16 and 16' are flat, as a rule; however, said faces also can have a conically tapering transition form.

Container 3 is installed in the exhaust gas system of internal combustion engine 2 instead of the muffler normally used. In the present embodiment, hollow body 4 is concentrically disposed relative to container 3 and short gas inlet pipe 5. Hollow body 4 consists of a cylinder having a jacket surface 7 with a great number of break-throughs 8. The cover surfaces of hollow body 4 are closed at the ends with the flat lids 20 and 21, whereby lid 21 has an aperture for short gas inlet pipe 5.

The soot particles-containing exhaust gas enters through short gas inlet pipe 5 into the interior of hollow body 4 and is pressed through the filter material due to the pressure building up, whereby more than 90% of the soot particles contained in the exhaust gas is filtered out.

So as to prevent the difference pressure in the interior of hollow body 4 from rising excessively high, it is necessary to select the quality of the filter material accordingly. In this lie the actual problem and solution of the present invention, namely to make available a filter material that assures both a relatively low difference pressure and a reasonable filtration effect acting on the soot particles.

The ceramic packets 9 are symbolically shown at the left end of hollow body 4. Metal wire 13 according to the invention is symbolically shown as well, said wire extending through the entire knitwork. The structure of the ceramic packets 9 according to the invention is explained in greater detail further below. Hollow cylinder 4 has a great number of said ceramic packets 9 according to the invention, which are compressed to a predetermined density by means of mechanical pressure.

The soot particles filtered out on the surfaces of ceramic yarns 12 of ceramic packets 9 reach the required ignition temperature of about 320° to 350° C. after only a short start-up time of engine 2, so that rapid burning of the soot particles takes place already at low temperatures, effecting the required regeneration of the deep-bed type filter.

Figure 3:
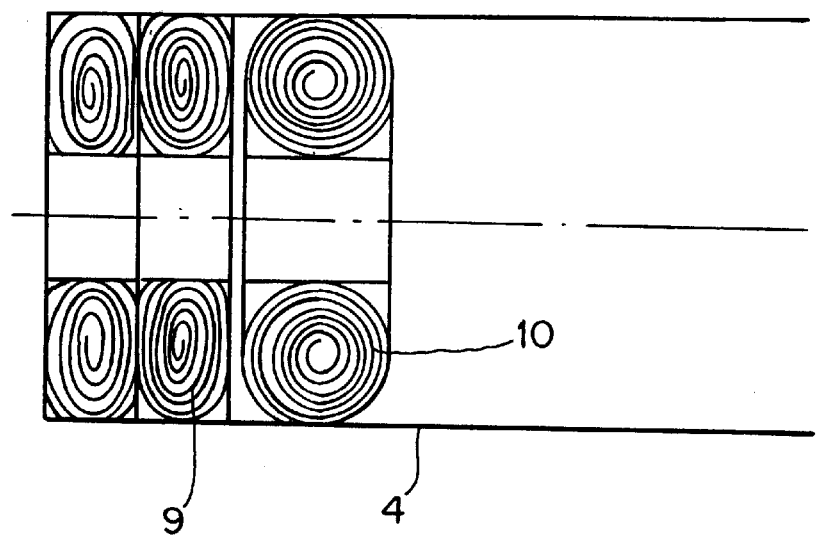
FIG. 3 shows a basic sectional view of a part of the hollow body (4) with the compressed and non-compressed ceramic packets (9, 10) according to the invention.

FIG. 3 shows by a cutout part of hollow body 4 represented by a sectional view. This representation shows clearly how the ceramic packets 9 according to the invention are supported and retained in hollow body 4 in their installed condition. This figure, furthermore, shows that the individual ceramic packet 9, 10 is produced from a knitted hose made of special ceramic yarn, such hose being rolled up from one end. Ceramic packet 10 represents the nonpressed and nondeformed and thus non-compressed filter material in its original state.

Figure 4:
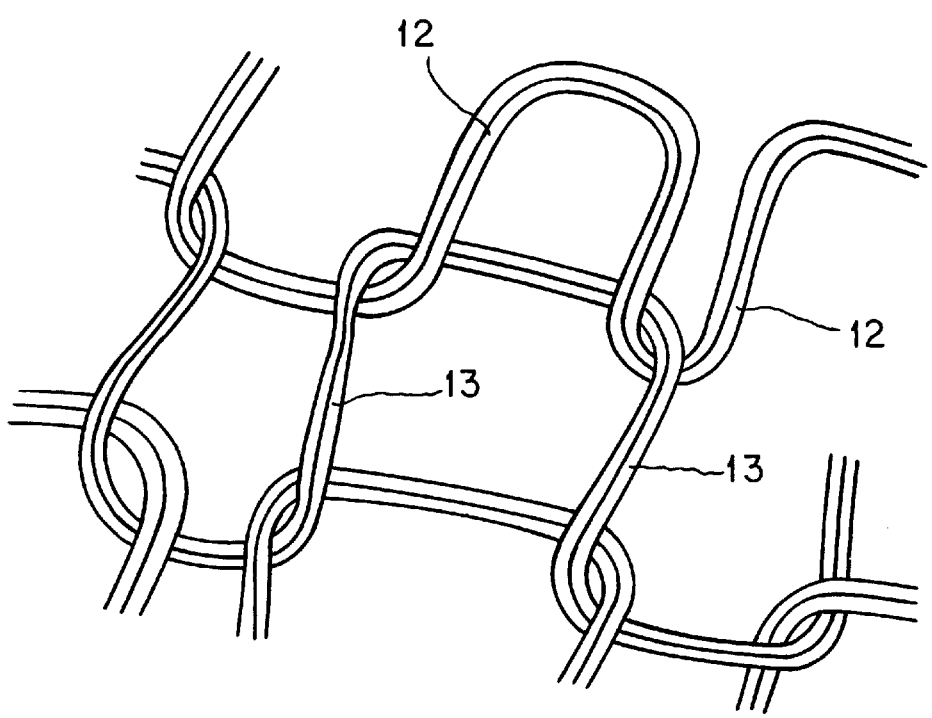
FIG. 4 shows a cutout from the knitting with the ceramic yarn (12) according to the invention together with the metal wire (3) according to the invention.
Figure 5:
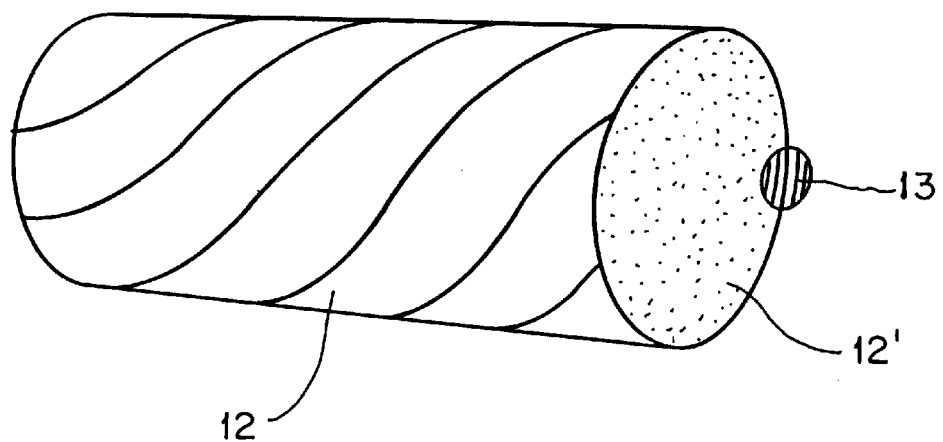
FIG. 5 shows a perspective sectional view of a part of the ceramic yarn (12) with the metal wire (13) according to the invention.

As stated herein earlier, ceramic packet 9, 10 of the invention consists of a rolled-up, oblong hose 22, which is knitted in a cylindrical shape with a certain knitting pattern, which is a right-left knitting pattern with a mesh width (a) between 4.5 and 7.5 mm and with a division of about 5, as this is shown in FIG. 4. This type of knitting pattern and mesh width was found in long-term tests to be the most favorable type of knitwork, as it assures the required difference pressure in the exhaust gas system with compression obtained correspondingly. A decisive contribution to such assurance is made by metal wire 13, which is jointly pulled through each individual mesh, permitting the required elasticity of the entire ceramic packet 9, on the one hand, and gradual compression of the knitting, on the other hand, which assures long useful life of the soot filter.

The special yarn 12 used for knitting the hose consists of the very fine ceramic filaments 12' with an average diameter of approximately 6 $\mu$m. Said yarn is commercially available under the commercial trade name Hakotherm-1200. The chemical composition of said ceramic filaments is as follows:

93.5% $\leq$ $SiO_2$
4.0% $\approx$ $Al_2O_3$
0.8% $\geq$ $Na_2O$.

Said ceramic material has a particularly high permanent thermal resistance, which is above 1,000° C. Furthermore, said material is resistant to most chemicals with the exception of hydrofluoric acid and phosphoric acid and strong lyes. Said ceramic filaments, furthermore, are friendly to the skin and harmless to health.

Yarn 12 is also composed of a great number of fine ceramic filaments 12', which are textured and twisted. Metal wire 13 according to the invention is accommodated next to or in the cross section of yarn 12, such wire extending through each individual mesh of the knitwork of the hose. In the present embodiment, the metal wire consists of a V4A-grade steel, which is heat-resistant, on the one hand, and has sufficient elasticity, on the other hand.

Figure 6:
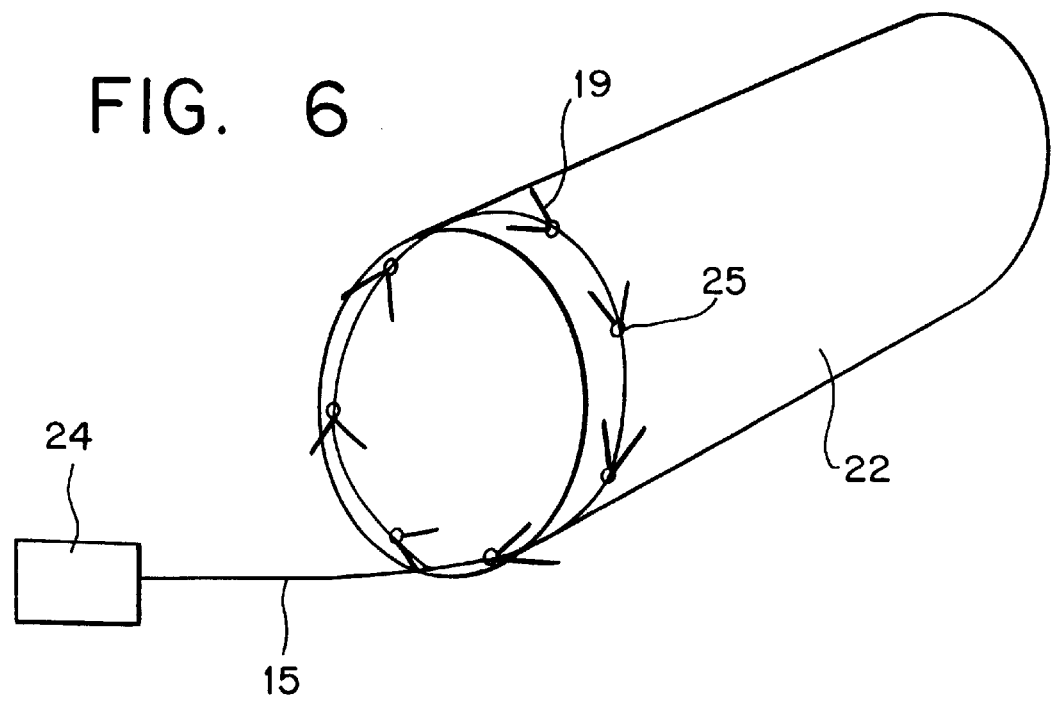
FIG. 6 shows a basic representation of a tool for producing the ceramic packet (9)

FIG. 6 shows a device for producing the ceramic packet 9, 10 according to the invention from an oblong, knitted hose 22. The tool consists of a wire 15, which has the barbs 19 on the last centimeters (10 to 15 cm). Said barbs are secured on wire 15—which has a thickness of about 4 mm—with a so-called flex joint 25. The end of the wire having the barbs is threadened at one end of the ceramic, knitted hose over the entire circumference of hose 22, and then put into rotation with a drive 24 not described in detail. Due to the centrifugal force of the barbs, which are connected with wire 15 via flex joint 25 only at one end, the barbs got hooked in the knotting and thereby roll up hose 22 completely, forming a bead, the so-called ceramic packet 9.

Figure 7:
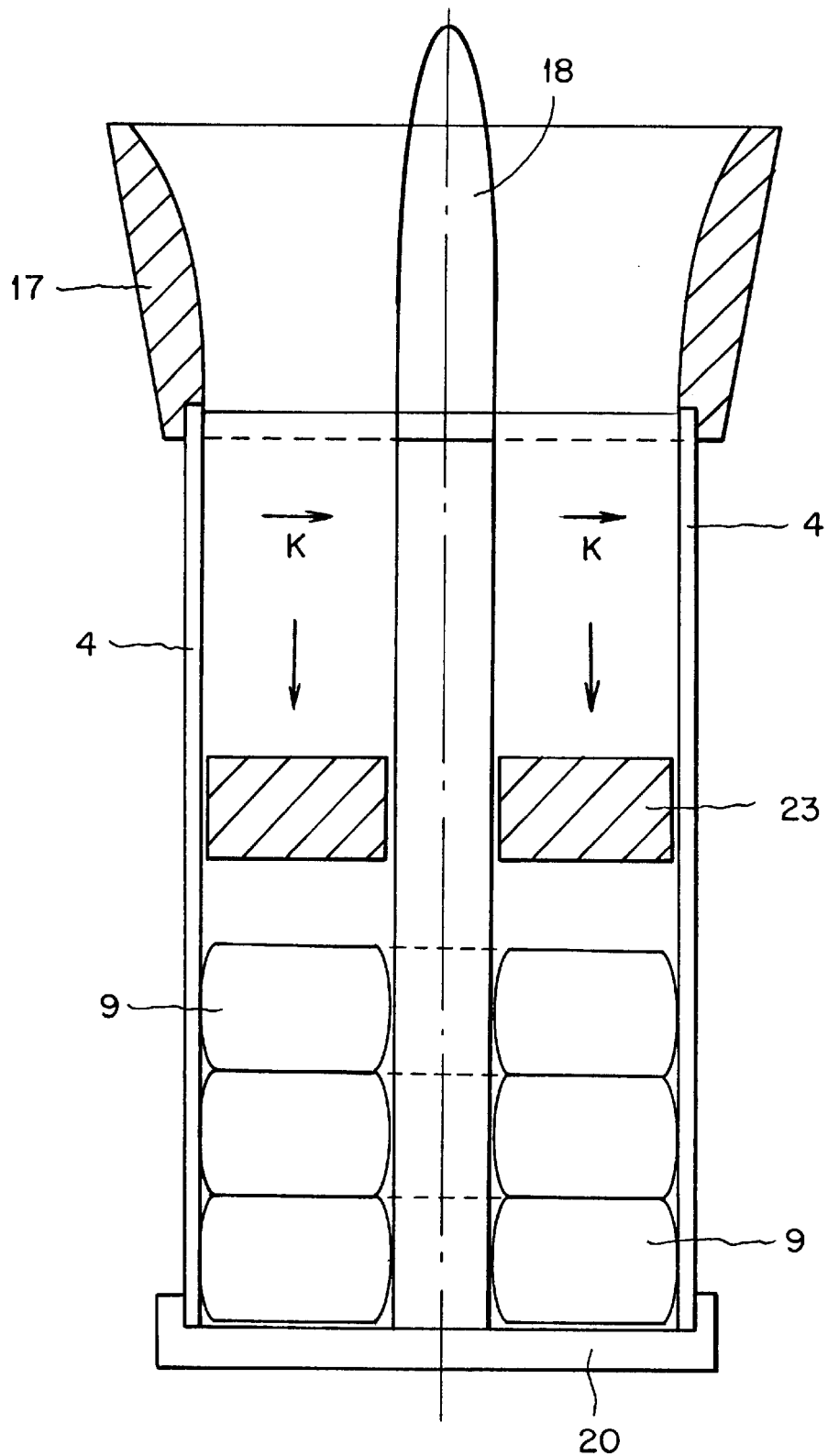
FIG. 7 shows a basic representation of the hollow body (4) with a device (17, 18) according to the invention for inserting the ceramic packets (9).

The finished packet 9 or 10 is then inserted in hollow body 4 with the help of a special device, as shown in FIG. 7. A matching ring 17 is placed on the outer edge of hollow body 4 at the open end, such ring having the shape of a funnel viewed in the longitudinal section. A mandrel 18 is present in the center of hollow body 4, such mandrel having approximately the inside diameter of ceramic packets 9, 10. The prefabricated ceramic packets 10 can be inserted in hollow body 4 either by hand or mechanically. After a certain number of ceramic packets 10 have been inserted, the filter material is compressed as explained above with the help of a punch 23 and closure 20 to a measure adapted to the intended application purpose. The mechanical pressure K comes to about 2 kg/cm$^2$ for a filter with an outside diameter of 38 mm. The ceramic net weight amounts to approximately 850 g over a length of 500 mm.

We claim:

1. Device for reducing the amount of soot particles exiting from an internal combustion engine (2) comprising a container (3) having a gas inlet pipe (5) and a gas outlet pipe (6) and said container being a hollow body (4) partly filled with a filter material;

said filter material being ceramic packets (9) comprising knitted tubes (22) made of extremely fine ceramic filaments (12'), said tubes being rolled up from one end, and said ceramic filaments being interwoven with a heat-resistant wire (13); and each tube being a knitted mesh and the heat-resistant wire (13) passing through each individual knitted mesh.

2. Device according to claim 1, wherein the hollow body (4) of the container (3) has a shape for receiving the ceramic packets (9).

3. Device according to claim 1, wherein the gas inlet pipe (5) is arranged concentrically with respect to the container (3).

4. Device according to claim 1, wherein the rolled-up ceramic packets (9) are compressed together to a defined length at a defined pressure.

5. Device according to claim 1, further comprising ceramic yarns (12) which are used for knitting and formed by the extremely fine ceramic filaments (12'), and each yarn (12) has a diameter of about 1 mm and is textured and twisted.

6. Device according to claim 1, wherein the hollow body (4) has walls (7) which have a great number of breakthroughs (8).

7. Device according to claim 1, wherein each knitted tube (22) has a mesh width (a) of about 4.5 mm and a division to about 5 mm, and has a right-left knitting pattern.

8. Device according to claim 1, wherein the chemical composition of the filter material is as follows:

93.5% $\leq$ $SiO_2$
4.0% $\approx$ $Al_2O_3$
0.8% $\geq$ $Na_2O$.

9. Device according to claim 1, wherein the heat-resistant wire is made of V4A-grade steel.

10. Device according to claim 1, wherein the ceramic filaments are thermally resistant ceramic knitting with a heat resistance of up to 1200° C.

11. Device according to claim 1, wherein the hollow body is a double-walled hollow body (4) and is closed by closure (20).

12. Device according to claim 1, wherein each ceramic packet (9) has a fabric packing density which depends on the gas flow rate per time unit.

13. Device according to claim 1, further comprising an additive containing iron which lowers an ignition temperature of the soot particles to 300° C. to 350° C.

14. Device according to claim 1, further comprising a pump device (29) for supplying an additive to a fuel for the engine.

15. Device according to claim 14, further comprising means for electronically controlling the pump device (29).

16. Device according to claim 1, wherein the hollow body (4) comprises a plug filter.

17. Process for producing the device of claim 1 comprising the steps of pulling a wire (15) of about 4 mm thickness with a great number of barbs (19) through one end (23) of the knitted tube (22), said barbs getting hooked in knitting of the tube; and turning the wire (15) with a drive (24) around a longitudinal axis until the knitted tube (22) is rolled up.

18. Process according to claim 17, further comprising inserting the rolled-up knitted tubes (22) as ceramic packets (9) into the hollow body (4) with the help of a special device (17, 18); and compressing the packets with the help of a punch (23) at 2 kg/cm$^2$, so that a ceramic weight of the ceramic packets (9) over 500 mm length at an inside diameter of 38 mm of the hollow body (4) amounts to 850 g.

19. Process according to claim 17, comprising providing each barb (19) with a hinge (25) at one end.

\* \* \* \* \*